United States Patent
Lee et al.

(10) Patent No.: US 8,460,021 B1
(45) Date of Patent: Jun. 11, 2013

(54) CARD INSERT/EJECT MECHANISM HAVING A POSITION-LIMITING PLATE ENGAGING A SLIDING BLOCK

(75) Inventors: Yi-Ming Lee, Taoyuan Hsien (TW); Chien-Yeh Lee, Taoyuan Hsien (TW)

(73) Assignee: Simula Technology Inc., Kwei Shan Hsiang (TW)

( * ) Notice: Subject to any disclaimer, the term of this patent is extended or adjusted under 35 U.S.C. 154(b) by 22 days.

(21) Appl. No.: 13/303,224

(22) Filed: Nov. 23, 2011

(51) Int. Cl.
*H01R 13/62* (2006.01)

(52) U.S. Cl.
USPC .......................................... 439/159

(58) Field of Classification Search
USPC ................................. 439/152–160
See application file for complete search history.

(56) References Cited

U.S. PATENT DOCUMENTS

| 7,491,074 B1 * | 2/2009 | Lai ................................ 439/159 |
| 7,537,470 B2 * | 5/2009 | Yamaguchi .................... 439/159 |
| 7,736,162 B1 * | 6/2010 | Chiang .......................... 439/159 |
| 8,292,643 B1 * | 10/2012 | Lee et al. ...................... 439/159 |

* cited by examiner

*Primary Examiner* — Chandrika Prasad
(74) *Attorney, Agent, or Firm* — Bacon & Thomas, PLLC (57) ABSTRACT

The present invention is to provide a card insert/eject mechanism, which includes an insulating seat formed with a receiving space and a track groove; a metal housing covering the receiving space and track groove and having a position-limiting resilient plate at a bottom surface thereof; a sliding block slidable along the track groove and laterally provided with a pushing portion that extends into the receiving space thereby, when an electronic card pushes the pushing portion, the sliding block is moved against rear end of the insulating seat; a resilient element provided in the track groove for applying a force to rear end of the sliding block; and a release bar disposed in the track groove for releasing the position-limiting resilient plate and enabling the sliding block to push the electronic card out of the receiving space, so as to effectively solve the insecure card engagement problem in conventional push-push connectors.

6 Claims, 7 Drawing Sheets

CARD INSERT/EJECT MECHANISM HAVING A POSITION-LIMITING PLATE ENGAGING A SLIDING BLOCK

FIELD OF THE INVENTION

The present invention relates to a card connector, more particularly to a card connector having a card insert/eject mechanism installed therein, so as to enhance structural strength thereof, solve the problem of insecure card engagement typical of conventional push-push connectors, and dispense with an easy-to-get-stuck and easy-to-get-loose positioning pin commonly used in the conventional push-push connectors.

BACKGROUND OF THE INVENTION

With the rapid development of information technology and of the electronic industry, consumer electronics are now evolving from one generation to the next on a regular basis. Some notable examples of such electronic products are digital still cameras, digital recorders, smart phones, digital game consoles, laptop computers, personal digital assistants (PDAs), and digital file players. These electronic products are available not only in a variety of types but also at more and more affordable prices, so that consumers can take advantage of, and enjoy the tremendous convenience brought by, the plethora of functions of such products.

The constantly evolving consumer electronics have also brought about a "digital" way of life. In particular, with the maturing of applicable techniques, it has been common practice to record, store, and transfer text-based information, image-based information, audio signals, or information having specific functions (e.g., user identification) in digital format. Currently, electronic cards such as memory cards and SIM (Subscriber Identity Module) cards are widely used in the afore-mentioned consumer electronics as an information storage medium to facilitate exchange of digital information between electronic products. In order for an electronic device to access the information stored in an electronic card, the electronic device must be equipped with a card connector or connected with an external card reader so as to realize proper electrical connection between the electronic card and the electronic device. As electronic devices nowadays are made increasingly smaller and lighter, miniaturization of electronic cards and card connectors is a must. Also, the card connector of an electronic device is typically configured as a card insertion slot to facilitate connection with electronic cards. This is because a slot-type card connector allows a user to insert an electronic card into an electronic device without having to open the housing of the electronic device. What needs to be solved next is how to facilitate the removal of an electronic card inserted in such a card connector.

Figure 1:
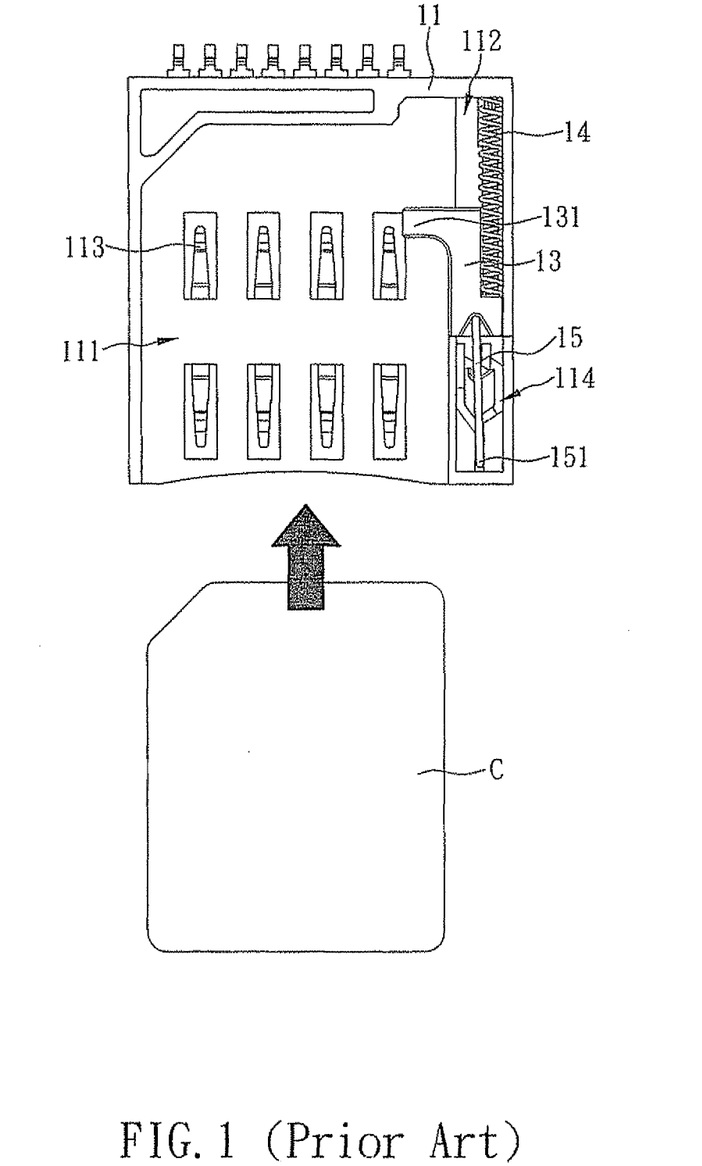
FIG. 1 is a schematic drawing of a conventional push-push connector.

Please refer to FIG. 1 for a schematic structural diagram of a conventional push-push connector. This connector includes an insulating seat 11, a sliding block 13, a resilient element 14, and a positioning pin 15. The insulating seat 11 is formed with a receiving space 111, a track groove 112, and a positioning track 114. The insulating seat 11 has an inner bottom surface corresponding in position to the receiving space 111 and provided with a plurality of signal terminals 113. The track groove 112 is adjacent to a lateral side of the receiving space 111 and proximate to the rear end of the insulating seat 11. The positioning track 114 is located at the front end of the track groove 112 and configured as a generally heart-shaped annular track, wherein the annular track consists of several track sections that have different heights and slopes. The sliding block 13 is disposed in and slidable along the track groove 112 and is laterally provided with a pushing portion 131 that extends into the receiving space 111. When an electronic card C (e.g., a SIM card) is inserted into the receiving space 111, the pushing portion 131 is pushed by one end of the electronic card C, and the sliding block 13 is thus pushed toward the rear end of the insulating seat 11.

The positioning pin 15 has one end connected to the sliding block 13 and can be driven by the sliding block 13 toward the rear end of the insulating seat 11. The other end of the positioning pin 15 forms a positioning portion 151 which is curved toward and movable along the positioning track 114. While the sliding block 13 is being pushed, the positioning portion 151 can press against different parts of the positioning track 114 to enable card insertion or ejection.

However, the card insert/eject mechanism of the push-push connector described above still has its drawbacks. First of all, the card insert/eject mechanism has low structural strength. More specifically, the connection between the connector and the electronic card inserted therein is not secure enough. The electronic card may be automatically ejected when the connector is subjected to external impact. Should it happen without the user knowing it, the electronic card may simply get lost. Moreover, the positioning pin, when moved along the positioning track, is very likely to get stuck in the track or come loose, thus hindering card insertion or ejection. As the connector is installed in an electronic device and is open to the outside only through the card insertion slot, it is difficult to perform maintenance work on the connector. In fact, the electronic device must be opened in order to troubleshoot the connector, which is extremely inconvenient. Therefore, the issue to be addressed by the present invention is to provide a card connector of higher structural strength so that not only can an electronic card be securely connected to the card connector but also the card connector itself is less prone to malfunction.

BRIEF SUMMARY OF THE INVENTION

In view of the various drawbacks of the card insert/eject mechanism of the conventional card connectors, the inventor of the present invention put years of practical experience into research and design and finally succeeded in developing a card insert/eject mechanism for use in a card connector. The card insert/eject mechanism disclosed herein allows a user to connect an electronic card firmly to a card connector and features a simple structure that minimizes the chances of malfunction.

It is an object of the present invention to provide a card insert/eject mechanism of a card connector, wherein the mechanism is applicable to a card connector of an electronic device (e.g., a smart phone) and includes an insulating seat, a metal housing, a sliding block, a resilient element, and a release bar. The insulating seat is formed with a receiving space and a track groove. The insulating seat has an inner bottom surface corresponding in position to the receiving space and provided with a plurality of signal terminals. The track groove is adjacent to a lateral side of the receiving space. The metal housing is connected to the insulating seat to form a single piece while covering the top of the receiving space and the top of the track groove; thus, the receiving space and the track groove form a card insertion slot and a bar hole at the front end of the insulating seat respectively. The bottom surface of the metal housing is provided with a position-limiting resilient plate that extends into the track groove.

The sliding block is provided in and slidable along the track groove. The top surface of the sliding block is formed with a position-limiting recess for receiving the position-limiting resilient plate. More particularly, once received in the position-limiting recess, the position-limiting resilient plate has one end pressing against the inner surface of the position-limiting recess and thereby fixes the sliding block in a released state. The sliding block is also laterally provided with a pushing portion that extends into the receiving space. When an electronic card (e.g., a SIM card) is inserted into the receiving space via the card insertion slot, the pushing portion is pushed by one end of the electronic card, and the sliding block is thus driven out of the released state and moved toward the rear end of the insulating seat. When the contacts on the electronic card are respectively and electrically connected to the signal terminals, the aforesaid end of the position-limiting resilient plate presses against the front end of the sliding block to secure the sliding block in a card inserted state.

The resilient element is provided in the track groove and applies a force to the rear end of the sliding block to bias the sliding block toward the front end of the insulating seat. The release bar is disposed in the track groove and has one end adjacent to the bar hole and the other end adjacent to the front end of the sliding block. When the release bar is pushed toward the sliding block, the end of the release bar that is adjacent to the sliding block pushes the position-limiting resilient plate. Consequently, the aforesaid end of the position-limiting resilient plate is disengaged from the front end of the sliding block, allowing the resilient element to move the sliding block toward the front end of the insulating seat. Thus, the electronic card is pushed out of the receiving space by the pushing portion of the sliding block.

The foregoing card insert/eject mechanism has high structural strength, solves the problem of insecure card engagement typical of the conventional push-push connectors, and dispenses with the easy-to-get-stuck and easy-to-get-loose positioning pin commonly used in the conventional connectors.

It is another object of the present invention to provide the foregoing card insert/eject mechanism, wherein the sliding block further has a lifting portion formed by an end of the position-limiting recess that is adjacent to the bar hole. While the sliding block is pushed by the electronic card, the lifting portion applies a force to the position-limiting resilient plate. Once the electronic card is inserted in place, the position-limiting resilient plate presses against the front end of the lifting portion.

It is still another object of the present invention to provide the foregoing card insert/eject mechanism, wherein the release bar has a greater height than the lifting portion. Thus, when the release bar is pushed into the track groove, the release bar pushes and lifts the position-limiting resilient plate, thereby bringing the position-limiting resilient plate to a disengaged state, in which the sliding block is movable toward the front end of the insulating seat. While the release bar is moved toward the front end of the insulating seat along with the sliding block, the position-limiting resilient plate presses against the top surface of the lifting portion. Once the lifting portion is moved to the front end of the position-limiting resilient plate, the position-limiting resilient plate resiliently resumes its original position and presses against the inner surface of the position-limiting recess.

Yet another object of the present invention is to provide a card insert/eject mechanism of a card connector, wherein the mechanism is applicable to a card connector of an electronic device and includes an insulating seat, a metal housing, a sliding block, a tray, a resilient element, and a release bar. The insulating seat is formed with a receiving space and a track groove. The insulating seat has an inner bottom surface corresponding in position to the receiving space and provided with a plurality of signal terminals. The track groove is adjacent to a lateral side of the receiving space. The metal housing is connected to the insulating seat to form a single piece while covering the top of the receiving space and the top of the track groove; thus, the receiving space and the track groove form a card insertion slot and a bar hole at the front end of the insulating seat respectively. The bottom surface of the metal housing is provided with a position-limiting resilient plate extending into the track groove.

The sliding block is provided in and slidable along the track groove. The sliding block has a pushing portion that extends into the receiving space. The tray is receivable in the receiving space and has one end configured to be pulled out of the receiving space through the card insertion slot. When the tray is inserted into the receiving space via the card insertion slot, the tray pushes the pushing portion and thereby moves the sliding block toward the rear end of the insulating seat. The bottom surface of the tray is formed with a card cavity for holding an electronic card. The top surface of the tray is formed with a position-limiting recess. The position-limiting recess is located on a lateral side of the tray that is adjacent to the track groove. In addition, the position-limiting recess is protrudingly provided with a lifting portion. When the position-limiting resilient plate has one end pressing against the inner surface of the position-limiting recess, the sliding block is fixed in a released state. When the tray is inserted into the receiving space through the card insertion slot, the lifting portion applies a force to the position-limiting resilient plate such that the position-limiting resilient plate is deformed and presses against the top surface of the lifting portion. Once the tray is inserted in place, i.e., to a position where the electronic card received in the card cavity is electrically connected to all the signal terminals, the position-limiting resilient plate resiliently resumes its original position and presses against the front end of the lifting portion. Thus, the tray is secured in a card inserted state.

The resilient element is provided in the track groove and applies a force to the rear end of the sliding block to bias the sliding block toward the front end of the insulating seat. Hence, driven by the resilient element, the pushing portion can push the tray out of the receiving space. The release bar, which is disposed in the track groove, has one end adjacent to the bar hole and the other end adjacent to the front end of the sliding block. When the release bar is pushed toward the sliding block, the release bar pushes the position-limiting resilient plate and thereby disengages the aforesaid end thereof from the front end of the lifting portion, allowing the resilient element to push sliding block against the release bar. Consequently, the tray is driven toward the front end of the insulating seat, causing the position-limiting resilient plate to press against the top surface of the lifting portion again. As soon as the external force applied to the release bar is removed, the resilient element pushes the sliding block, which in turn pushes the release bar and the tray. Thus, the tray is pushed out of the receiving space, and the user can now remove the electronic card from the card cavity. In the two-stage releasing process described above, the resilient force of the resilient element is kept from being released all at once; therefore, the tray will not throw the electronic card out of the card cavity as may otherwise occur if the tray, under full force of the resilient element, dashes out through the card insertion slot.

The card insertion slots of some conventional card connectors are directly exposed on the surface of an electronic device and may therefore compromise the appearance of the electronic device. Besides, dust may easily enter a conventional card connector through the card insertion slot if there is no electronic card inserted therein. To solve these two problems, some manufacturers designed a cover for covering, and thereby preventing the entry of dust into, a card insertion slot while giving an integrated look to an electronic device having the card insertion slot. Nevertheless, the opening and closing of such a cover can be difficult and annoying, simply considering the fact that both electronic devices and electronic cards are made increasingly smaller. By contrast, the card connector proposed by the present invention can be so designed that the tray and the release bar match the exterior of an electronic device and therefore will not impair the overall look of the electronic device. In addition, the tray, once pushed in place, can keep off dust regardless of whether there is an electronic card in the tray. The configurations of the tray and the release bar also make easy the insertion and ejection of electronic cards.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 2:
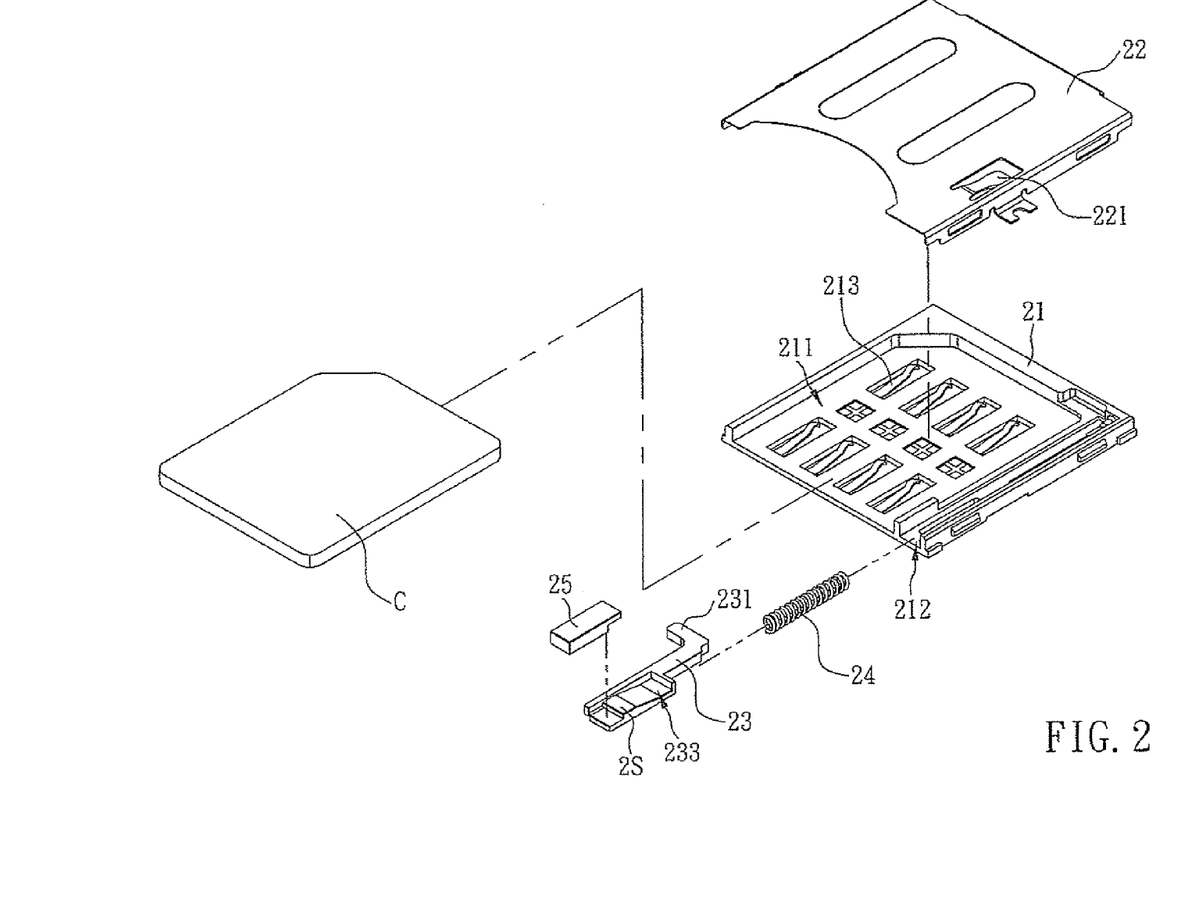
FIG. 2 is an exploded perspective view of the first preferred embodiment of the present invention.
Figure 3:
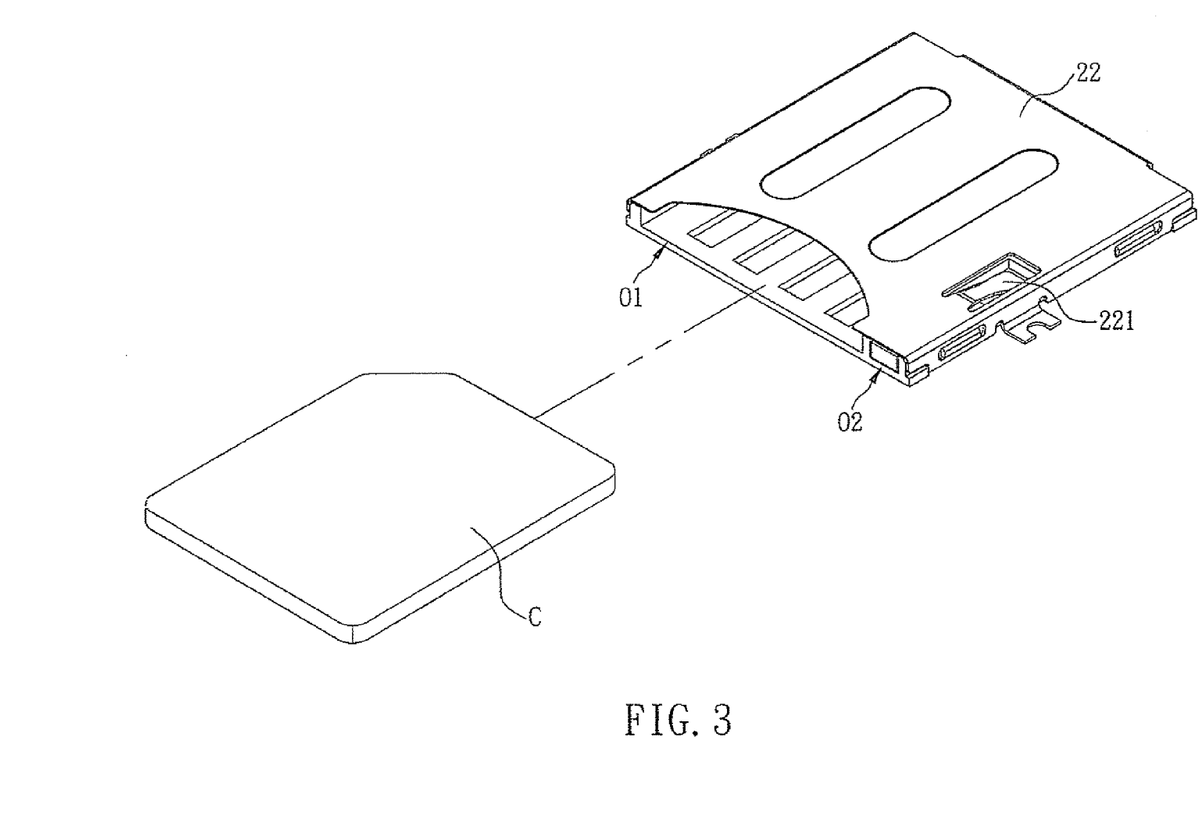
FIG. 3 is an assembled perspective view of the first preferred embodiment of the present invention.

The present invention discloses a card insert/eject mechanism of a card connector. More particularly, the card insert/eject mechanism is applicable to a card connector of an electronic device. Referring to FIG. 2, a mechanism according to the first preferred embodiment of the present invention includes an insulating seat 21, a metal housing 22, a sliding block 23, a resilient element 24, and a release bar 25. The insulating seat 21 is formed with a receiving space 211 and a track groove 212. A plurality of signal terminals 213 are distributed over an inner bottom surface of the insulating seat 21 that corresponds in position to the receiving space 211. The track groove 212 is adjacent to a lateral side of the receiving space 211. The metal housing 22 is connected to the insulating seat 21 to form a single piece and thereby cover the top of the receiving space 211 and the top of the track groove 212; consequently, the receiving space 211 and the track groove 212 form a card insertion slot O1 and a bar hole O2 at the front end of the insulating seat 21 respectively (see FIG. 3). The metal housing 22 is provided with a position-limiting resilient plate 221 on the bottom surface, and the position-limiting resilient plate 221 extends into the track groove 212.

However, the configuration and location of the position-limiting resilient plate 221 are not limited to those disclosed herein and may be modified as needed. For instance, the position-limiting resilient plate 221 may have a structure similar to the signal terminals 213 and be provided on an inner bottom surface of the insulating seat 21 that corresponds in position to the track groove 212, with all those components interacting with the position-limiting resilient plate 221 being modified accordingly. All equivalent changes easily conceivable by a person skilled in the art should fall within the scope of the present invention.

As shown in FIG. 2, the sliding block 23 is disposed in the track groove 212 and can slide along the track groove 212. The top surface of the sliding block 23 is formed with a position-limiting recess 233. The position-limiting recess 233 is configured for receiving the position-limiting resilient plate 221 in such a way that the position-limiting resilient plate 221 has one end pressing against the inner surface of the position-limiting recess 233, thereby fixing the sliding block 23 in a released state. Nevertheless, the configuration of the position-limiting recess 233 is not limited to that described above. The position-limiting recess 233 is no more than a space for receiving the position-limiting resilient plate 221, and it does not matter whether the position-limiting resilient plate 221, when received in the position-limiting recess 233, has one end pressing against the inner surface of the position-limiting recess 233. Furthermore, the position-limiting recess 233 is merely a space lower than its surroundings, and it is not required that the rear end of the position-limiting recess 233 (i.e., the end portion closer to the rear end of the insulating seat 21) be higher than the position-limiting recess 233 as in the present embodiment. Therefore, equivalent changes can be made as appropriate, and all equivalent modifications readily conceivable by a person of skill in the art should fall within the scope of the present invention. In this embodiment, the end of the position-limiting recess 233 that is closer to the release bar 25 forms a lifting portion 2S for applying a force to the position-limiting resilient plate 221. The sliding block 23 is also laterally provided with a pushing portion 231. The pushing portion 231 extends into the receiving space 211 so that, when an electronic card C (e.g., a memory card) is inserted into the receiving space 211 through the card insertion slot O1 (see FIG. 3), the pushing portion 231 is pushed by one end of the electronic card C. Thus, the sliding block 23 is driven out of the released state and moved toward the rear end of the insulating seat 21. Once the contacts of the electronic card C are respectively and electrically connected to the signal terminals 213, the aforesaid end of the position-limiting resilient plate 221 presses against the front end of the lifting portion 2S and thereby fixes the sliding block 23 in a card inserted state.

Referring again to FIG. 2, the resilient element 24 is provided in the track groove 212 and applies a force to the rear end of the sliding block 23 to bias the sliding block 23 toward the front end of the insulating seat 21. The release bar 25, which is also provided in the track groove 212, has one end adjacent to the bar hole O2 (see FIG. 3) and an opposite end adjacent to the front end of the sliding block 23.

Figure 4:
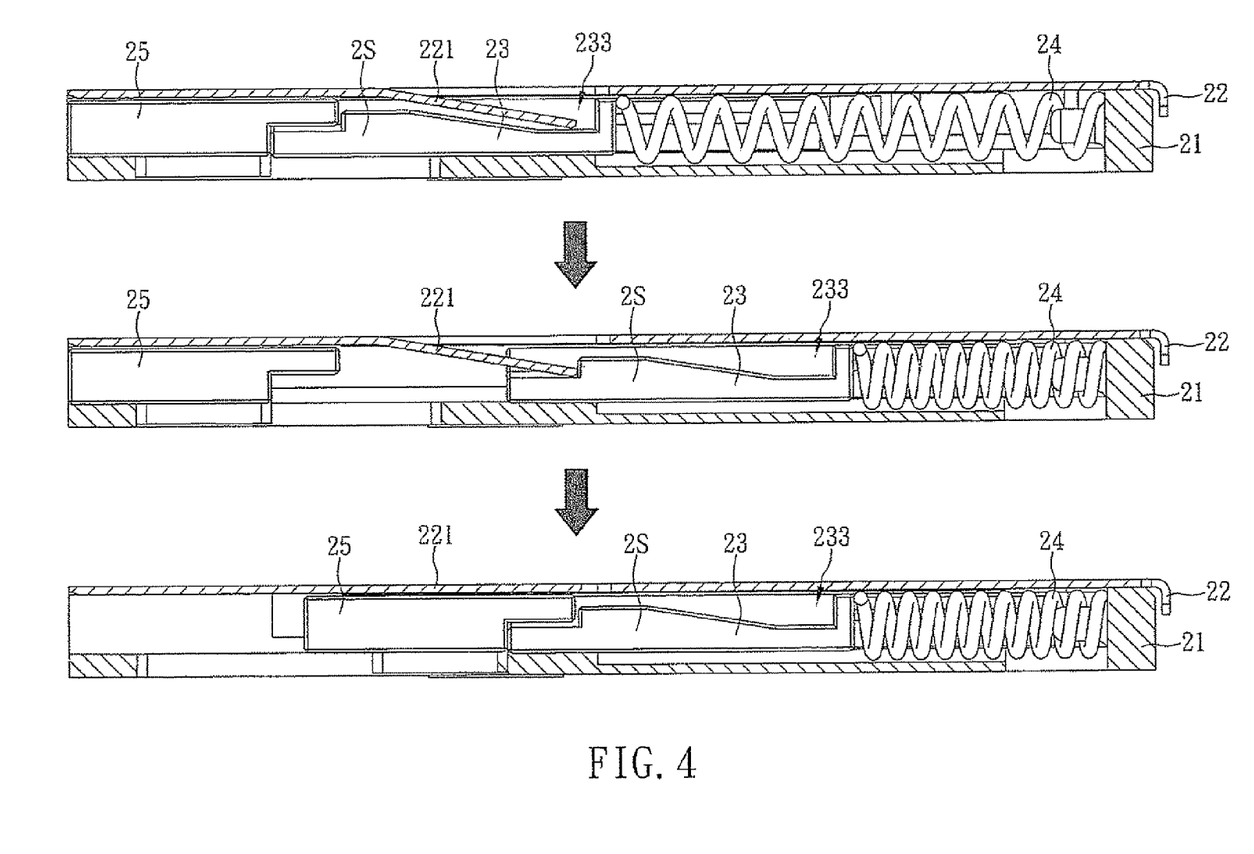
FIG. 4 shows the operation of the first preferred embodiment of the present invention, as divided into three consecutive steps.

The card inserting and ejecting processes of this embodiment are detailed as follows with reference to FIG. 4, which shows the consecutive movements and relative positions of the components in the track groove 212. In the top drawing of FIG. 4, the sliding block 23 is in the released state (i.e., a card ejected state), and the position-limiting resilient plate 221, bending downward, presses against the inner surface of the position-limiting recess 233. The lifting portion 2S in this state lies under the position-limiting resilient plate 221. When pushed by the electronic card C (see FIG. 3), the sliding block 23 is slid toward the rear end of the insulating seat 21. As a result, the lifting portion 2S applies a force to the position-limiting resilient plate 221, and the position-limiting resilient plate 221 is lifted (i.e., deflected upward) through elastic deformation. Meanwhile, the resilient element 24 is compressed by the sliding block 23 and applies a reaction force thereto to slide the sliding block 23 toward the front end of the insulating seat 21. Reference is now made to the middle drawing of FIG. 4, in which the sliding block 23 is in the card inserted state. Once the lifting portion 2S moves completely past the position-limiting resilient plate 221 and therefore stops supporting the position-limiting resilient plate 221 from below, the position-limiting resilient plate 221 resiliently resumes its original position and presses against the front end of the lifting portion 2S. Because of that, the sliding block 23 is prevented from sliding toward the front end of the insulating seat 21 under the action of the resilient element 24, and the connector as a whole is fixed securely in the card inserted state. Referring to the bottom drawing of FIG. 4, when it is desired to remove the electronic card C, the user may apply a force to the release bar 25 to slide the release bar 25 toward the sliding block 23. During the sliding process, the end of the release bar 25 that is adjacent to the sliding block 23 applies a force to the position-limiting resilient plate 221 to disengage the aforesaid end of the position-limiting resilient plate 221 from the front end of the lifting portion 2S. Then, the release bar 25 and the lifting portion 2S apply forces to the position-limiting resilient plate 221 sequentially. Once the release bar 25 slides toward the front end of the insulating seat 21 and moves to a position where the release bar 25 can support the position-limiting resilient plate 221 no more, the position-limiting resilient plate 221 presses against the lifting portion 2S and is kept in a disengaged state, allowing the resilient element 24 to push the sliding block 23 and thereby eject the electronic card C. As soon as the lifting portion 2S stops applying any force to the position-limiting resilient plate 221, the position-limiting resilient plate 221 resiliently resumes its original position and once again presses on the inner surface of the position-limiting recess 233. Thus, the connector is brought back to the card ejected state.

The mechanism described above features high structural strength and can solve the problems of the conventional push-push connectors, such as insecure card engagement and the positioning pin's getting stuck or coming loose.

Figure 5:
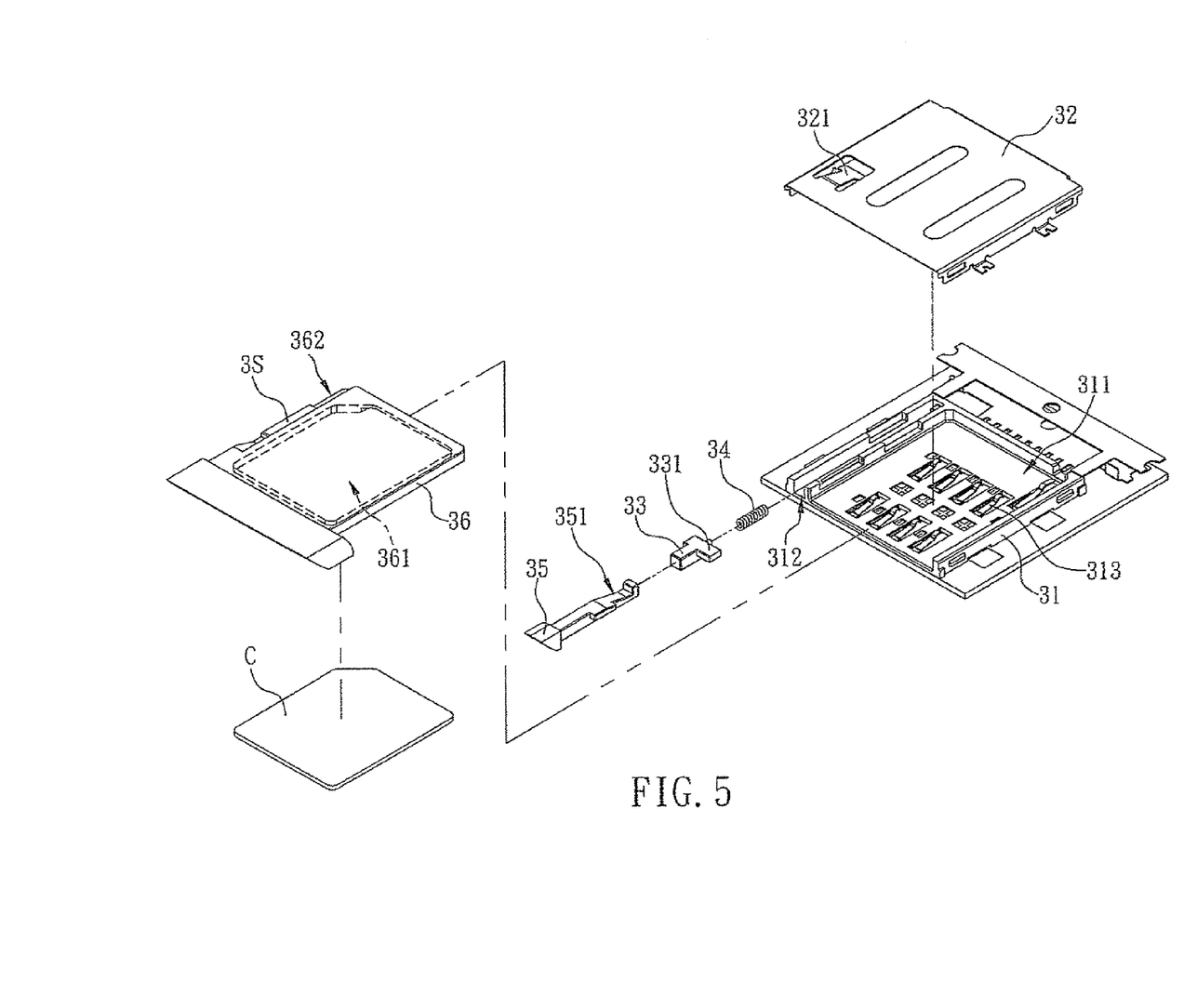
FIG. 5 is an exploded perspective view of the second preferred embodiment of the present invention.
Figure 6:
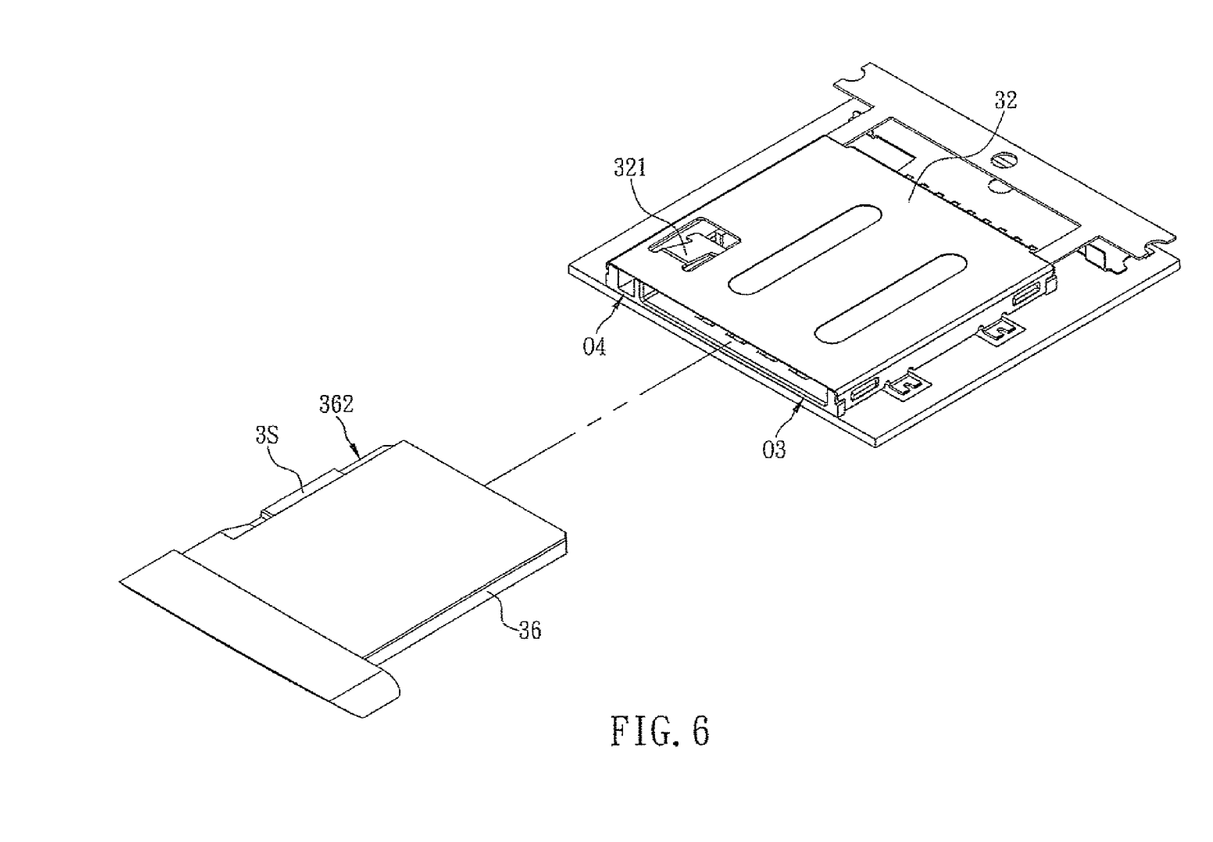
FIG. 6 is an assembled perspective view of the second preferred embodiment of the present invention.

FIG. 5 shows a card insert/eject mechanism according to the second preferred embodiment of the present invention, wherein the mechanism is applicable to a card connector of an electronic device and includes an insulating seat 31, a metal housing 32, a sliding block 33, a tray 36, a resilient element 34, and a release bar 35. The insulating seat 31 is formed with a receiving space 311 and a track groove 312. An inner bottom surface of the insulating seat 31 that corresponds in position to the receiving space 311 is provided with a plurality of signal terminals 313. The track groove 312 is adjacent to a lateral side of the receiving space 311. The metal housing 32 is connected to the insulating seat 31 to form a single unit, wherein the metal housing 32 covers the top of the receiving space 311 and the top of the track groove 312 such that the receiving space 311 and the track groove 312 form a card insertion slot O3 and a bar hole O4 at the front end of the insulating seat 31 respectively (see FIG. 6). In addition, the bottom surface of the metal housing 32 is provided with a position-limiting resilient plate 321 that extends into the track groove 312.

The sliding block 33 is disposed in and slidable along the track groove 312 and has a pushing portion 331 extending into the receiving space 311. The tray 36 can be received in the receiving space 311 and has one end configured for being pulled out of the receiving space 311 through the card insertion slot O3 (see FIG. 6). When inserted into the receiving space 311 via the card insertion slot O3, the tray 36 pushes the pushing portion 331 and thereby moves the sliding block 33 toward the rear end of the insulating seat 31. The bottom surface of the tray 36 is formed with a card cavity 361 for holding an electronic card C, while the top surface of the tray 36 is formed with a position-limiting recess 362. The position-limiting recess 362 is situated on a lateral side of the tray 36 that is adjacent to the track groove 312. The position-limiting recess 362 is also protrudingly provided with a lifting portion 3S. When the position-limiting resilient plate 321 has one end pressing against the inner surface of the position-limiting recess 362, the sliding block 33 is fixed in a released state. When the tray 36 is inserted into the receiving space 311 through the card insertion slot O3 (see FIG. 6), the lifting portion 3S applies a force to and thereby deforms the position-limiting resilient plate 321. As a result, the position-limiting resilient plate 321 presses against the top surface of the lifting portion 3S. Once the tray 36 is inserted in place, i.e., to a position where the electronic card C received in the card cavity 361 is electrically connected to all the terminals 313, the position-limiting resilient plate 321 resiliently resumes its original position and is engaged with the front end of the lifting portion 3S, thereby fixing the tray 36 in a card inserted state.

The resilient element 34 is provided in the track groove 312 and applies a force to the rear end of the sliding block 33, thereby biasing the sliding block 33 toward the front end of the insulating seat 31 and allowing the tray 36 to be pushed out of the receiving space 311 by the pushing portion 331. The release bar 35 is located in the track groove 312 and has one end adjacent to the bar hole O4 (see FIG. 6) and an opposite end adjacent to the front end of the sliding block 33. The release bar 35 further has a recessed portion 351 for receiving the position-limiting resilient plate 321. Before the release bar 35 is pushed, the aforesaid end of the position-limiting resilient plate 321 presses against the recessed portion 351. When the release bar 35 is pushed toward the sliding block 33, the release bar 35 pushes the position-limiting resilient plate 321 and thereby disengages the aforesaid end thereof from the front end of the lifting portion 3S. Now, the sliding block 33 is movable by the resilient element 34 and can in turn drive the tray 36 toward the front end of the insulating seat 31 until the position-limiting resilient plate 321 presses on the top surface of the lifting portion 3S again. As soon as the external force applied to the release bar 35 is removed, the resilient element 34 pushes the sliding block 33 and thereby pushes the release bar 35 and the tray 36; in consequence, the tray 36 is ejected from the receiving space 311 so as for the user to remove the electronic card C from the card cavity 361.

Figure 7:
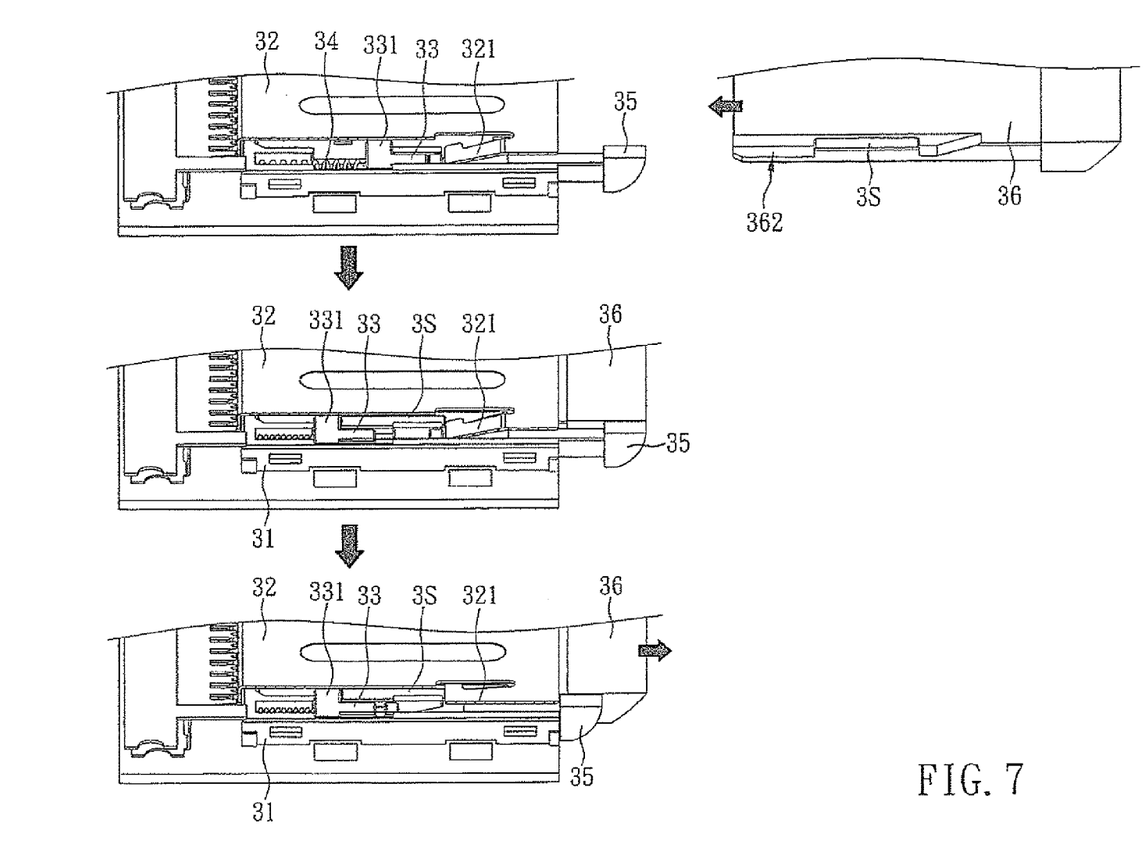
FIG. 7 shows the operation of the second preferred embodiment of the present invention, as divided into three consecutive steps.

A detailed description of the card inserting and ejecting processes of this embodiment is provided below with reference to FIG. 7, which shows the consecutive movements and relative positions of the components in the track groove 312. In the top drawing of FIG. 7, the sliding block 33 is in the released state. When the tray 36 is inserted from the front end of the insulating seat 31, the lifting portion 3S applies a force to the position-limiting resilient plate 321 to elastically deform and thereby lift the position-limiting resilient plate 321. In this embodiment, the lifting portion 3S further pushes the sliding block 33 such that the sliding block 33 is slid toward the rear end of the insulating seat 31 and compresses the resilient element 34. In return, the resilient element 34 applies a reaction force to the sliding block 33 and drives the sliding block 33 toward the front end of the insulating seat 31. In the process, the position-limiting recess 362 passes under the position-limiting resilient plate 321 and the sliding block 33 without pushing them; in other words, the position-limiting recess 362 only provides the support required for the stability of the entire structure. Now refer to the middle drawing of FIG. 7 in which the sliding block 33 is in the card inserted state. When the lifting portion 3S moves completely past the position-limiting resilient plate 321 and therefore stops supporting the position-limiting resilient plate 321 from below, the position-limiting resilient plate 321 resiliently resumes its original position and presses against the front end of the lifting portion 3S. At the same time, the lifting portion 3S is pressed against the sliding block 33, so the sliding block 33 will not slide toward the front end of the insulating seat 31 under the action of the resilient element 34. As a result, the connector as a whole is securely fixed in the card inserted state. Referring to the bottom drawing of FIG. 7, when it is desired to take out the electronic card C (see FIG. 5), the user may apply a force to the release bar 35 to slide the release bar 35 toward the sliding block 33. In this embodiment, the end of the release bar 35 that is adjacent to the sliding block 33 will not be directly brought into contact with the sliding block 33 by pushing the release bar 35. While sliding toward the sliding block 33, the release bar 35 applies a force to the position-limiting resilient plate 321 to disengage the aforesaid end thereof from the front end of the lifting portion 3S. Then, under the action of the resilient element 34, the sliding block 33 is pressed against the release bar 35 and pushes the lifting portion 3S. Because of that, the aforesaid end of the position-limiting resilient plate 321 presses against the top surface of the lifting portion 3S once more, and the release bar 35 and the lifting portion 3S apply forces to the position-limiting resilient plate 321 in turn. Once the release bar 35 slides toward the front end of the insulating seat 31 and reaches a position where the release bar 35 can no longer support the position-limiting resilient plate 321, the position-limiting resilient plate 321 presses against the lifting portion 3S and is kept in the disengaged state. As a result, the tray 36 is driven indirectly by the resilient element 34 to slide toward the front end of the insulating seat 31. The user can grip the front end of the tray 36 and pull the tray 36 out when the sliding block 33 stops pushing the lifting portion 3S. The position-limiting resilient plate 321 will resiliently resume its original position and thereby bring the connector back to the card ejected state as soon as the lifting portion 3S stops applying any force to the position-limiting resilient plate 321.

It should be understood that the foregoing embodiments are only some preferred embodiments of the present invention and are not restrictive of the technical features of the present invention. All variations or modifications easily conceivable by a person skilled in the art should be encompassed by the appended claims.

What is claimed is:

1. A card insert/eject mechanism of a card connector, applicable to a card connector of an electronic device, the card insert/eject mechanism comprising:
   an insulating seat formed with a receiving space and a track groove, the insulating seat having an inner bottom surface which corresponds in position to the receiving space and is provided with a plurality of signal terminals, the track groove being adjacent to a lateral side of the receiving space;
   a metal housing connected to the insulating seat to form a single piece, wherein the metal housing covers a top of the receiving space and a top of the track groove such that the receiving space and the track groove form a card insertion slot and a bar hole at a front end of the insulating seat respectively, the metal housing having a bottom surface provided with a position-limiting resilient plate, the position-limiting resilient plate extending into the track groove;
   a sliding block provided in and slidable along the track groove, the sliding block having a top surface formed with a position-limiting recess for receiving the position-limiting resilient plate in such a way that an end of the position-limiting resilient plate presses against an inner surface of the position-limiting recess, the sliding block being laterally provided with a pushing portion extending into the receiving space so that, when an electronic card is inserted into the card insertion slot, the pushing portion is pushed by an end of the electronic card and thus moves the sliding block away from the bar hole, causing the end of the position-limiting resilient plate to disengage from the position-limiting recess and press against a front end of the sliding block;
   a resilient element provided in the track groove and configured for applying a force to a rear end of the sliding block, thereby biasing the sliding block toward the bar hole; and
   a release bar provided in and slidable along the track groove, the release bar having an end adjacent to the bar hole and an opposite end adjacent to the front end of the sliding block, wherein the release bar, when pushed, applies a force to the position-limiting resilient plate such that the end of the position-limiting resilient plate does not press against the front end of the sliding block.

2. The card insert/eject mechanism of claim 1, wherein the sliding block further has a lifting portion, the lifting portion being formed by an end of the position-limiting recess that is adjacent to the bar hole so that, when the sliding block is pushed by the electronic card, the lifting portion applies a force to the position-limiting resilient plate, and once the electronic card is completely inserted in the receiving space, the position-limiting resilient plate presses against a front end of the lifting portion.

3. The card insert/eject mechanism of claim 2, wherein the release bar has a greater height than the lifting portion.

4. A card insert/eject mechanism of a card connector, applicable to a card connector of an electronic device, the card insert/eject mechanism comprising:
   an insulating seat formed with a receiving space and a track groove, the insulating seat having an inner bottom surface which corresponds in position to the receiving space and is provided with a plurality of signal terminals, the track groove being adjacent to a lateral side of the receiving space;
   a metal housing connected to the insulating seat to form a single piece, wherein the metal housing covers a top of the receiving space and a top of the track groove such that the receiving space and the track groove form a card insertion slot and a bar hole at a front end of the insulating seat respectively, the metal housing having a bottom surface provided with a position-limiting resilient plate, the position-limiting resilient plate extending into the track groove;
   a tray receivable in the receiving space and having an end configured to be pulled out of the receiving space through the card insertion slot, the tray further having a bottom surface formed with a card cavity for holding an electronic card and a top surface formed with a position-limiting recess, the position-limiting recess having an inner surface against which an end of the position-limiting resilient plate can press, the position-limiting recess being protrudingly provided with a lifting portion for applying a force to the position-limiting resilient plate;

a sliding block provided in and slidable along the track groove, the sliding block having a pushing portion extending into the receiving space so that, when the tray is inserted into the card insertion slot, the pushing portion is pushed by the tray and thus moves the sliding block away from the bar hole, causing the end of the position-limiting resilient plate to press against a front end of the lifting portion;

a resilient element provided in the track groove and configured for applying a force to a rear end of the sliding block, thereby biasing the sliding block toward the bar hole; and a release bar provided in and slidable along the track groove, the release bar having a first end adjacent to the bar hole and a second end adjacent to a front end of the sliding block, wherein the release bar, when pushed, applies a force to the position-limiting resilient plate such that the end of the position-limiting resilient plate does not press against the front end of the lifting portion.

5. The card insert/eject mechanism of claim 4, wherein the second end of the release bar can be pressed against the front end of the sliding block so that, when the release bar applies a force to the position-limiting resilient plate to release the tray, the sliding block is moved toward the front end of the insulating seat and pressed against the release bar, thus allowing the lifting portion to apply a force to the position-limiting resilient plate to enable ejection of the tray from the receiving space.

6. The card insert/eject mechanism of claim 5, wherein the release bar further has a recessed portion for receiving the position-limiting resilient plat in such a way that the end of the position-limiting resilient plate presses against the recessed portion.

* * * * *